United States Patent
Yeh

(10) Patent No.: US 6,862,018 B2
(45) Date of Patent: Mar. 1, 2005

(54) CORDLESS PRESSURE-SENSITIVITY AND ELECTROMAGNETIC-INDUCTION SYSTEM WITH SPECIFIC FREQUENCY PRODUCER AND TWO-WAY TRANSMISSION GATE CONTROL CIRCUIT

(75) Inventor: Chia Jui Yeh, Taipei (TW)

(73) Assignee: Aiptek International Inc., Hsin-Chu (TW)

( * ) Notice: Subject to any disclaimer, the term of this patent is extended or adjusted under 35 U.S.C. 154(b) by 280 days.

(21) Appl. No.: 09/985,104

(22) Filed: Nov. 1, 2001

(65) Prior Publication Data

US 2003/0079921 A1 May 1, 2003

(51) Int. Cl.⁷ .............................................. G09G 5/00
(52) U.S. Cl. .................... 345/173; 345/179; 178/18.07; 178/19.03
(58) Field of Search ............................... 345/173–179; 178/18.01–18.07, 19.01–19.07, 20.01–20.08

(56) References Cited

U.S. PATENT DOCUMENTS

| | | | | |
|---|---|---|---|---|
| 5,059,749 A | * | 10/1991 | Murakami et al. ............. | 178/19 |
| RE34,187 E | * | 3/1993 | Yamanami et al. ............ | 178/19 |
| 5,777,604 A | * | 7/1998 | Okajima et al. ............. | 345/173 |
| 5,898,136 A | * | 4/1999 | Katsurahira .............. | 178/18.01 |
| 6,473,075 B1 | * | 10/2002 | Gomes et al. .............. | 345/177 |
| 2003/0066691 A1 | * | 4/2003 | Jelinek et al. ............ | 178/18.01 |

FOREIGN PATENT DOCUMENTS

JP         11-311649        * 11/1999    ........... G01R/29/08

* cited by examiner

Primary Examiner—Bipin Shalwala
Assistant Examiner—Tom Sheng
(74) Attorney, Agent, or Firm—Rosenberg, Klein & Lee

(57) ABSTRACT

The system with cordless pressure-sensitivity and electromagnetic-induction of the present invention comprises the first wireless apparatus and the second wireless apparatus. The first wireless apparatus comprises the first sub-circuit for emitting and receiving an electromagnetic wave with a specific frequency, and the second wireless apparatus comprises the second sub-circuit for emitting and receiving an electromagnetic wave with a specific frequency. The first sub-circuit comprises: an inductance coil, a rectifier that is coupled with the inductance coil and a charge sub-circuit. The second sub-circuit comprises: a sub-circuit for generating a specific frequency that is coupled with the control sub-circuit and a two-way gate control sub-circuit.

31 Claims, 6 Drawing Sheets

500A

CORDLESS PRESSURE-SENSITIVITY AND ELECTROMAGNETIC-INDUCTION SYSTEM WITH SPECIFIC FREQUENCY PRODUCER AND TWO-WAY TRANSMISSION GATE CONTROL CIRCUIT

BACKGROUND OF THE INVENTION

1. Field of the Invention

The present invention relates generally to a system with cordless pressure-sensitivity and electromagnetic-induction, and more particularly to a system with cordless pressure-sensitivity and electromagnetic-induction, wherein the system can emit and receive the specific frequency.

2. Description of the Prior Art

Because a handwriting recognition system could replace the mouse, and is more suitable than the mouse to let the user input words and patterns by user's hands, improvement of the handwriting recognition system is a hot and important field of current computer technology. The original intention of the handwriting recognition system is to replace the mouse. As usual, to enhance the user's convenience, a handwriting recognition system would usually replace the mouse by both wireless pen and tablet. Herein, the pen nib of the wireless pen usually corresponds to the left button of the mouse. Conventional handwriting recognition systems have been developed for many years, but these products are applied to perform only one function, such as drawing or inputting a word.

Usually, a handwriting recognition system is a device with cordless pressure-sensitivity and electromagnetic-induction. FIG. 1 shows a circuit block diagram of a conventional cordless pressure-sensitive and electromagnetic-induction device. Conventional cordless pressure-sensitivity and electromagnetic-induction device comprises: a cordless pen and a tablet. There is an oscillating circuit that consists of LC in the cordless pen. If the pen point is touched, the amount of inductance will be changed that results in the variation of oscillating frequency. The amount of inductance is increased when touching the pen point and increasing pressure so the variation of oscillating frequency is also increased. Therefore, the variation of the pressure on the pen point can be detected by way of the variation of oscillating frequency. There are two switches on the sidewall of the cordless pen, the emitted frequency of the cordless pen can be changed with the capacitance variation of the LC device that is produced by pushing down or setting free the switches. Furthermore, the tablet comprises a detector, a amplifier and an analog-digital converter. In the conventional tablet, there is a detected loop in the center region of the tablet, with one-way antennas located on the double faces of the detected loop, wherein the one-way antennas are equidistantly arranged in order by way of using array. The main purpose of the one-way detected loop is only applied to receive the electromagnetic wave that is emitted by the cordless pen. When the cordless pen emits the electromagnetic wave, the one-way antennas receive the electromagnetic wave, and then the tablet can obtain correlative information by the electromagnetic induction. However, a conventional system with cordless pressure-sensitivity and electromagnetic-induction can only receive the electromagnetic wave from the peripheral apparatus thereof and detect the position of the peripheral apparatus. In accordance with the above description, a new system with cordless pressure-sensitivity and electromagnetic-induction is therefore necessary, so as to strengthen and increase the functions of the apparatus with cordless pressure-sensitivity and electromagnetic-induction.

SUMMARY OF THE INVENTION

In accordance with the present invention, a new system with cordless pressure-sensitivity and electromagnetic-induction is provided that substantially overcomes the drawbacks of above mentioned problems from the conventional system.

Accordingly, it is an object of the present invention to provide a new system with cordless pressure-sensitivity and electromagnetic-induction. The present invention can apply a two-way gate control sub-circuit in the system with cordless pressure-sensitivity and electromagnetic-induction, so as to receive the electromagnetic wave from the peripheral apparatus and emit the specific electromagnetic wave to the peripheral apparatus.

Another object of the present invention is to provide a specific frequency producer. This invention can apply the specific frequency producer, so as to generate a specific frequency, and the specific frequency is transmitted via two-way antennas of the tablet to induce current and voltage in the peripheral apparatus that has a charge circuit with inductance coil. The present invention can achieve the effect of a wireless charge. Therefore, this invention corresponds to economic effect and utilization in industry.

In accordance with the present invention, a new system with cordless pressure-sensitivity and electromagnetic-induction is provided. The system with cordless pressure-sensitivity and electromagnetic-induction of the present invention comprises the first wireless apparatus and the second wireless apparatus. The first wireless apparatus comprises the first sub-circuit for emitting and receiving an electromagnetic wave with a specific frequency, and the second wireless apparatus comprises the second sub-circuit for emitting and receiving an electromagnetic wave with a specific frequency. The first sub-circuit comprises: an inductance coil, a rectifier that is coupled with the inductance coil and a charge sub-circuit. The second sub-circuit comprises: a control sub-circuit; a sub-circuit for generating a specific frequency that is coupled with the control sub-circuit; a two-way gate control sub-circuit that is individually coupled with the control sub-circuit and the sub-circuit for generating a specific frequency; a sub-circuit for switching the antenna that is coupled with the control sub-circuit; a two-way transmission antenna that is coupled with the sub-circuit for switching the antenna.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Although specific embodiments have been illustrated and described, it will be obvious to those skilled in the art that various modifications may be made without departing from what is intended to be limited solely by the appended claims.

Figure 1:
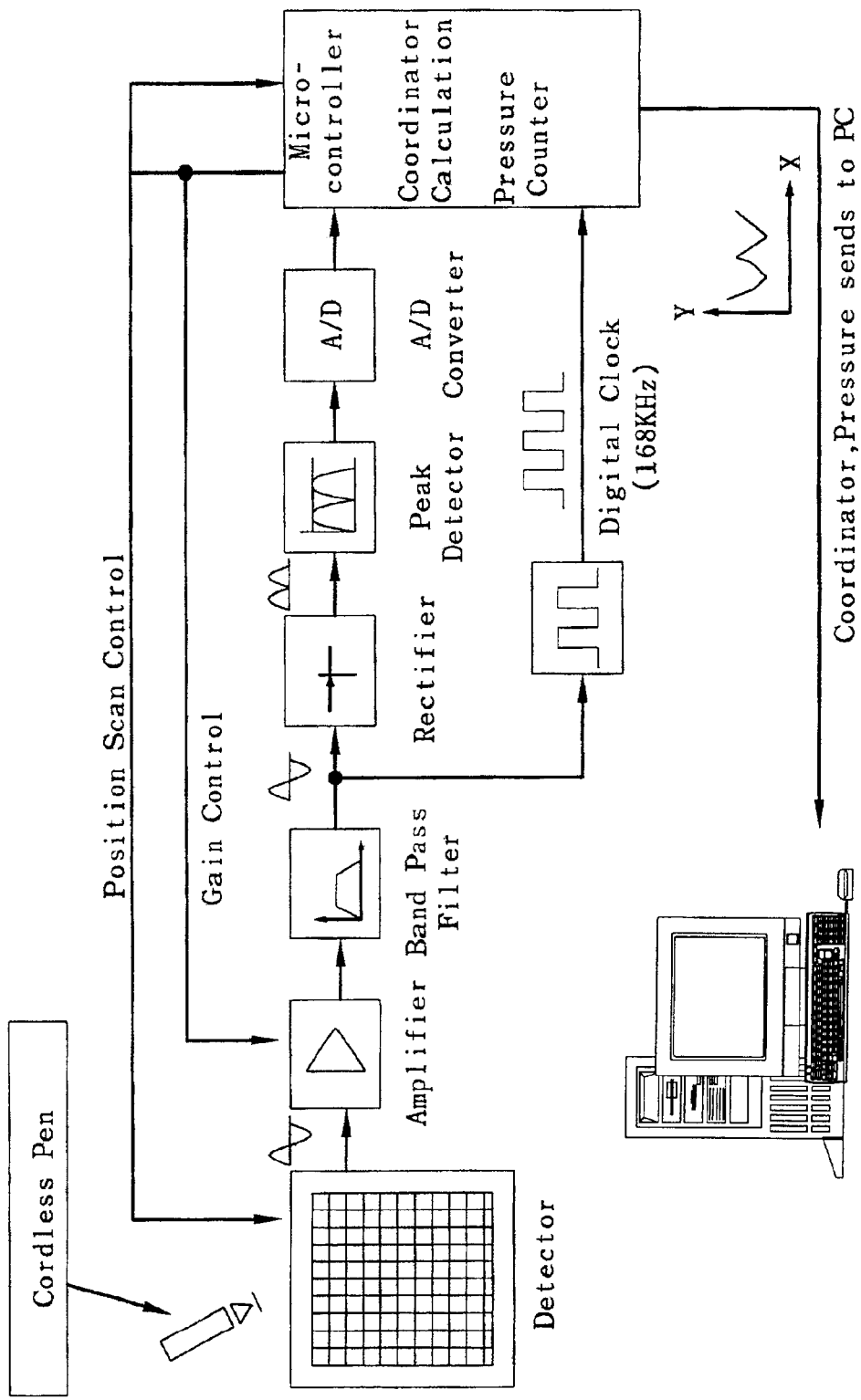
FIG. 1 shows cross-sectional views illustrative of block diagram of the conventional apparatus with cordless pressure-sensitivity and electromagnetic-induction.
Figure 2:
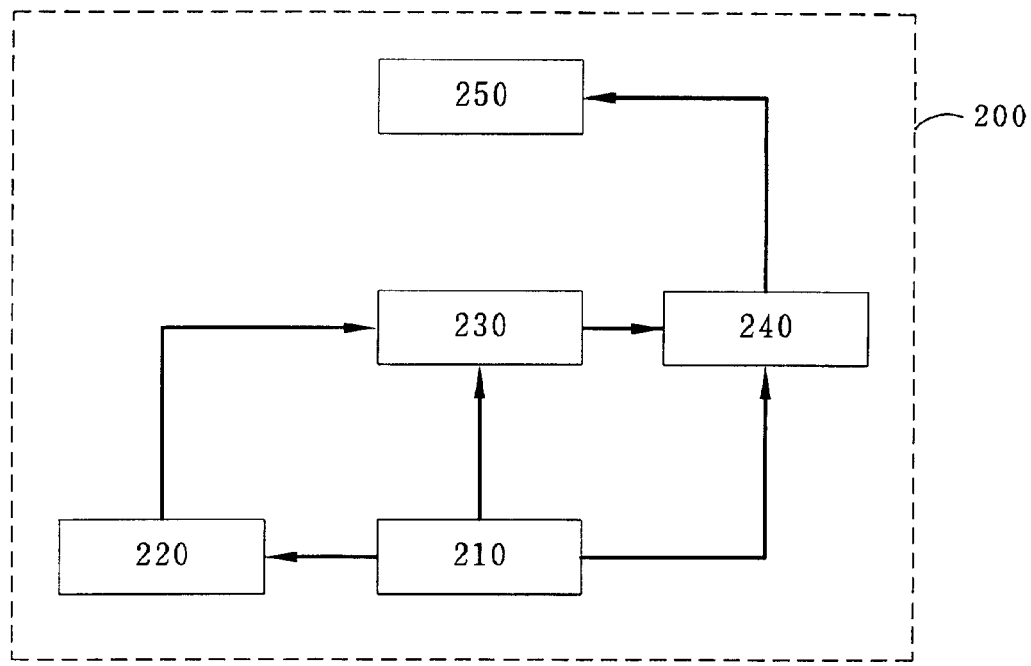
FIG. 2 shows block diagram of the system with cordless pressure-sensitivity and electromagnetic-induction in accordance with the first embodiment of the present invention.

As illustrated in FIG. 2, in the first embodiment of the present invention, first of all, a circuit 200 with cordless pressure-sensitivity and electromagnetic-induction is provided. The circuit 200 comprises: a control sub-circuit 210, such as a micro-controller; a sub-circuit 220 for generating a specific frequency that is coupled with the control sub-circuit 210, and the sub-circuit 220 for generating a specific frequency can be set to produce a frequency arrange, wherein the sub-circuit 220 for generating a specific frequency comprises a programmable frequency divider and a flip-flop device, such as a D-type flip-flop device; a two-way gate control sub-circuit 230 that is individually coupled with the control sub-circuit 210 and the sub-circuit 220 for generating a specific frequency, wherein the two-way gate control sub-circuit 230 comprises a plurality of one-way gate control switches; a sub-circuit 240 for switching the antenna that is coupled with the control sub-circuit 210, wherein the sub-circuit 240 for switching the antenna comprises an antenna address bus and a plurality of antenna switches; a two-way transmission antenna loop 250 that is coupled with the sub-circuit 240 for switching the antenna.

Figure 3:
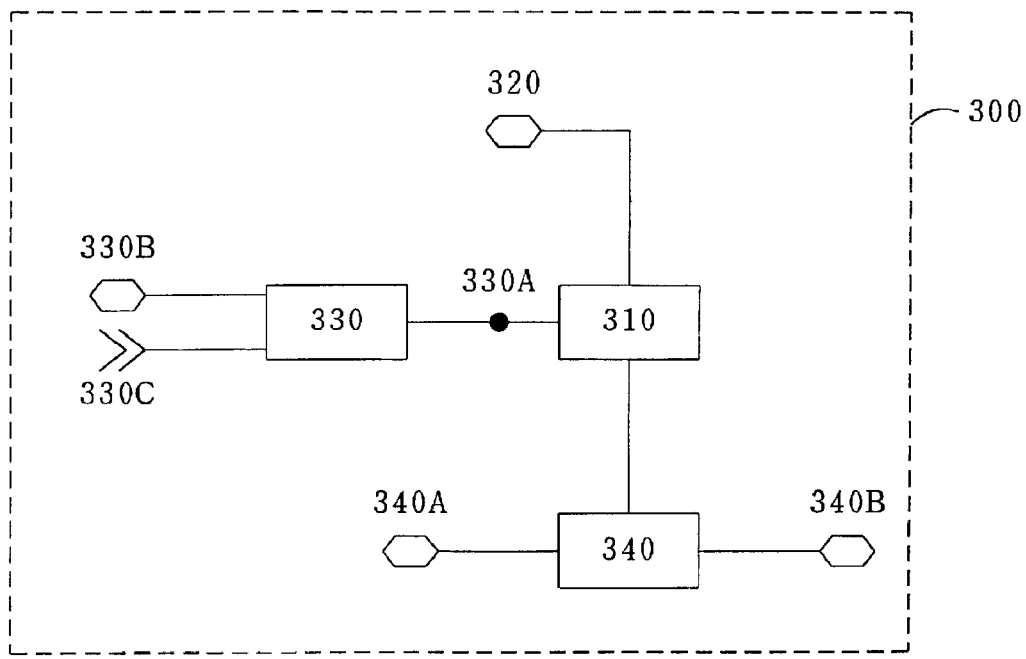
FIG. 3 shows block diagram of the circuit for generating the specific frequency in the system with cordless pressure-sensitivity and electromagnetic-induction in accordance with the second embodiment of the present invention.

As illustrated in FIG. 3, in the second embodiment of the present invention, first of all, a circuit 300 for generating specific frequency in the system with cordless pressure-sensitivity and electromagnetic-induction is provided. The circuit 300 for generating specific frequency comprises: a programmable frequency divider 310 that is coupled with a frequency control bus; a NAND gate 330, the output terminal 330A of the NAND gate 330 is coupled with the programmable frequency divider 310, wherein the first input terminal 330B of the NAND gate 330 is a clock enable terminal and the second input terminal 330C of the NAND gate 330 is a clock input terminal; a flip-flop device 340, such as D-type flip-flop device, that is coupled with the programmable frequency divider 310, wherein the flip-flop device 340 comprises a specific frequency enable terminal 340A and a specific frequency output terminal 340B. A value of 8 bits can be set by the micro-controller in the system with cordless pressure-sensitivity and electromagnetic-induction, and then the value of 8 bits is transmitted into the circuit 300 for generating specific frequency via the frequency control bus 320, wherein the arrange of specific frequency is about between (clock signal)/256 and (clock signal)/1; for example, when the clock signal is about 6 MHz, the arrange of specific frequency is about between 23.4375 KHz and 6 MHz. Afterward, the first dividing process is performed by way of using the programmable frequency divider 310 to form the first specific frequency. The first specific frequency is then transmitted into the flip-flop device 340 to perform the second dividing process, so as to form the second specific frequency, wherein the second dividing process of the flip-flop device 340 can be controlled by way of using the specific frequency enable terminal 340A, and the arrange of specific frequency in the second dividing process is about between (clock signal)/512 and (clock signal)/2. Subsequently, the second specific frequency is outputted from the flip-flop device 340 via the specific frequency output terminal 340B.

Figure 4:
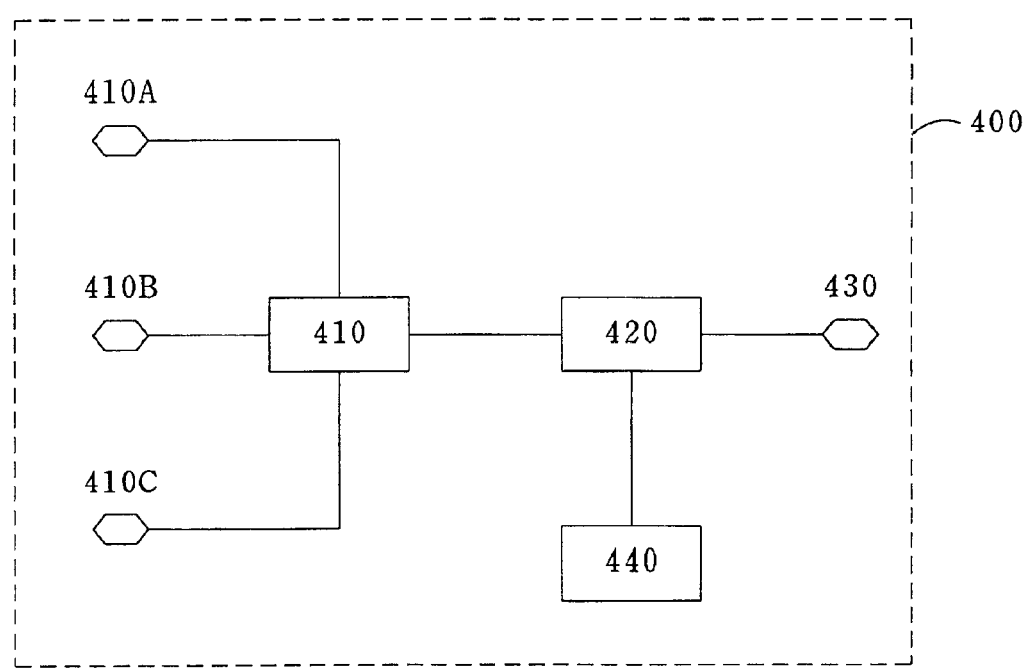
FIG. 4 shows block diagram of the circuit for transmitting signal of antenna in the system with cordless pressure-sensitivity and electromagnetic-induction in accordance with the third embodiment of the present invention.

As illustrated in FIG. 4, in the third embodiment of the present invention, first of all, a circuit 400 for transmitting signal of antenna in the system with cordless pressure-sensitivity and electromagnetic-induction is provided. The circuit 400 for transmitting antenna signal comprises: a two-way gate control sub-circuit 410, the first terminal 410A of the two-way gate control sub-circuit 410 is coupled with an amplifier of the system with cordless pressure-sensitivity and electromagnetic-induction to transmit the signal into the amplifier, the second terminal 410B of the two-way gate control sub-circuit 410 is coupled with an I/O device of a micro-controller of the system with cordless pressure-sensitivity and electromagnetic-induction to control transmitted direction of the two-way gate control sub-circuit 410, and the third terminal 410C of the two-way gate control sub-circuit 410 is coupled with a sub-circuit for generating specific frequency of the system with cordless pressure-sensitivity and electromagnetic-induction to receive a specific frequency, wherein the two-way gate control sub-circuit 410 comprises a plurality of one-way gates whose transmitting directions are different from each other; an switch group 420 for controlling antenna is individually coupled with the two-way gate control sub-circuit 410 and a plurality of the antennas 430, wherein the switch group 420 for controlling antenna comprises a plurality of two-way transmission switches for controlling antenna, wherein each two-way transmission switch can control at least eight antennas; an antenna address bus 440 that is individually coupled with the micro-controller of the system with cordless pressure-sensitivity and electromagnetic-induction and the switch group 420 for controlling antenna, whereby the micro-controller can in sequence switch on the antenna in accord with the time-sharing, and also can transmit the signal with the specific frequency to the antennas 430.

Figure 5A:
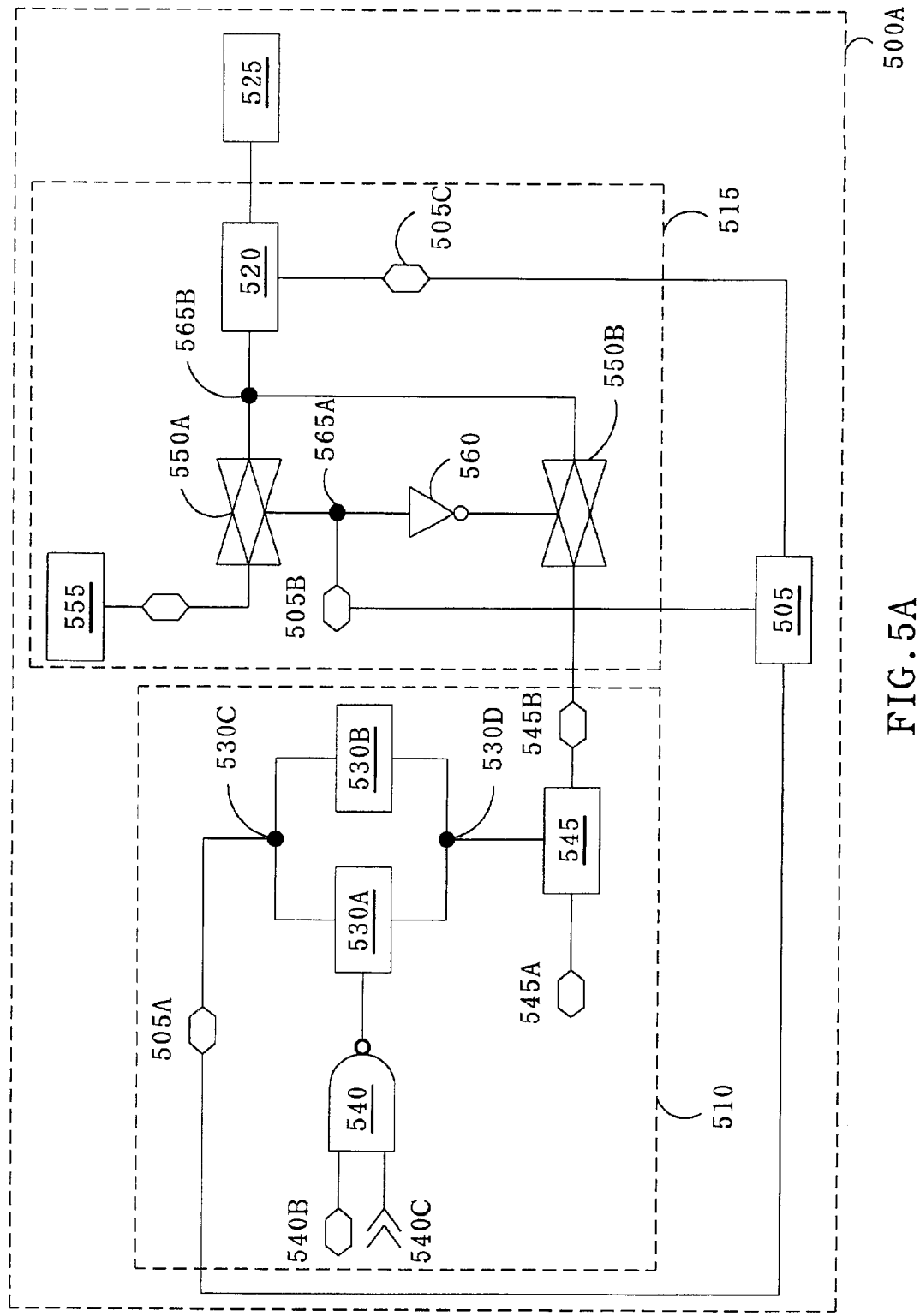
FIG. 5A shows block diagram of the circuit with two-way transmission and electromagnetic induction in the system with cordless pressure-sensitivity and electromagnetic-induction in accordance with the fourth embodiment of the present invention.
Figure 5B:
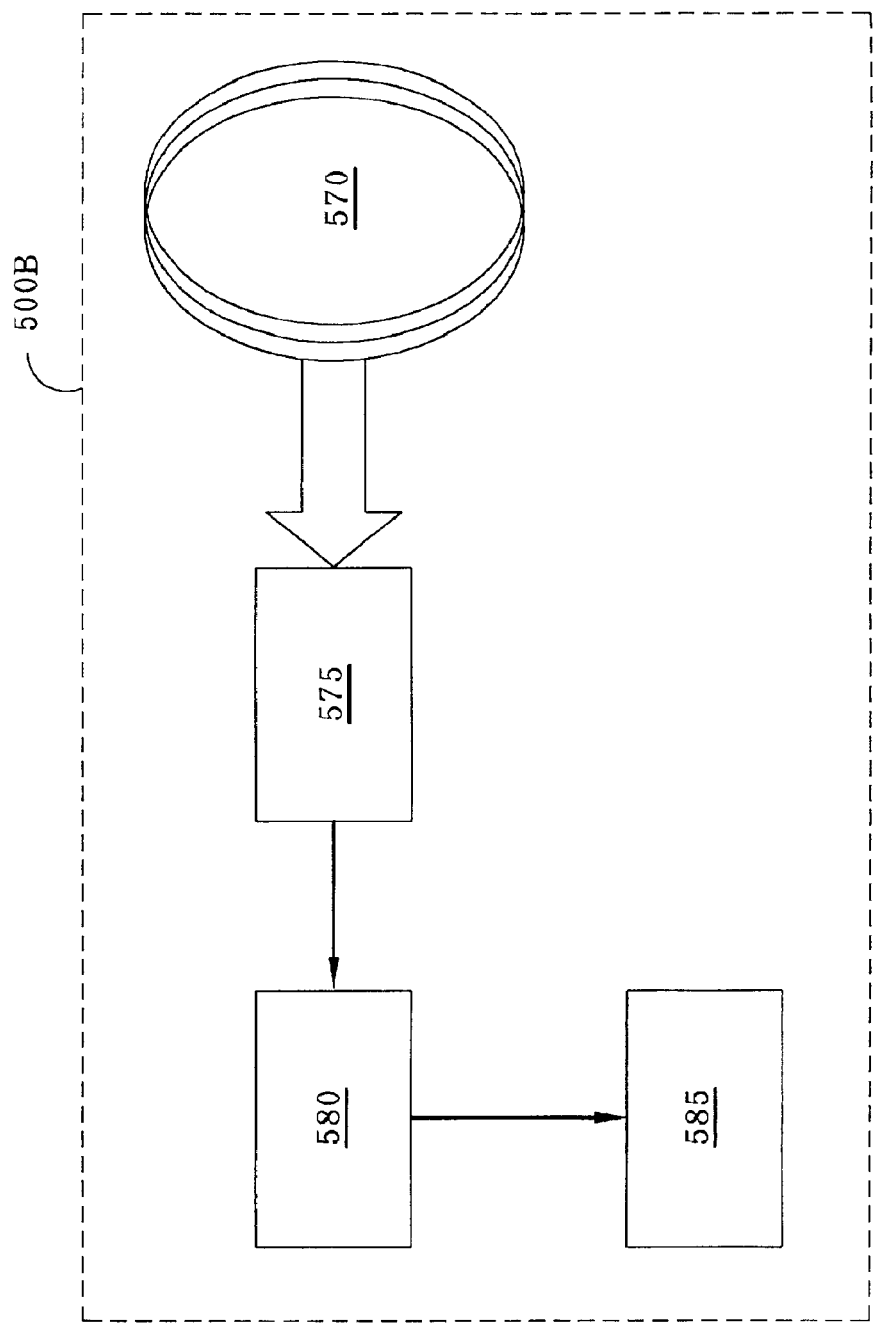
FIG. 5B shows block diagram of the peripheral apparatus with wireless electromagnetic-induction that has the induced-charge circuit in accordance with the fourth embodiment of the present invention.

As illustrated in FIG. 5A and FIG. 5B, in the fourth embodiment of the present invention, first of all, an apparatus with cordless pressure-sensitivity and electromagnetic-induction is provided, the apparatus with cordless pressure-sensitivity and electromagnetic-induction comprises a circuit 500A with two-way transmission and electromagnetic induction, such as tablet, and a peripheral apparatus with wireless electromagnetic-induction that has a induced-charge circuit 500B, such as cordless pen. The circuit 500A with two-way transmission and electromagnetic induction comprises a specific frequency generator 510, a two-way gate control device 515, an antenna switch group 520 and a two-way antenna group 525. The specific frequency generator 510 is coupled with the micro-controller 505 of the apparatus with cordless pressure-sensitivity and electromagnetic-induction, and the specific frequency generator 510 can be set so as to produce an arrange of the specific frequency. Furthermore, the two-way gate control device 515 is individually coupled with the micro-controller 505 and the specific frequency generator 510. Moreover, the antenna switch group 520 is coupled with the micro-controller 505. On the other hand, the two-way antenna group 525 is individual coupled with the antenna switch group 520 and the micro-controller 505.

Referring to FIG. 5A, in this embodiment, the specific frequency generator 510 comprises: the first programmable frequency divider 530A and the second programmable frequency divider 530B, which are coupled from each other to form the first node 530C and the second node 530D, wherein the first node 530C is coupled with the micro-controller 505 by way of using a frequency control bus 505A; a NAND gate 540 whose output terminal 540A is coupled with the first programmable frequency divider 530A, wherein the first input terminal 540B of the NAND gate 540 is a clock enable terminal, and the second input terminal 540C of the NAND gate 540 is a clock input terminal; a D-type flip-flop device 545 that is coupled with the second node 530D, wherein the D-type flip-flop device 545 comprises a specific frequency enable terminal 545A of and a specific frequency output terminal 545B.

Referring to FIG. 5A, in this embodiment, the two-way gate control device 515 comprises: the first one-way gate 550A whose the first terminal is coupled with an amplifier 555 of the apparatus with cordless pressure-sensitivity and electromagnetic-induction; an NOT gate 560 whose the input terminal is coupled with the second terminal of the first one-way gate 550A to form the third node 565A, wherein the third node 565A is coupled with the I/O control terminal 505B of the micro-controller 505; the second one-way gate 550B whose the first terminal is coupled with the output terminal of the NOT gate 560 and the second terminal is coupled with the specific frequency output terminal 545B of the D-type flip-flop device 545, and the third terminal of the second one-way gate 550B is coupled with the third terminal of the first one-way gate 550A to form the fourth node 565B, wherein the gate control directions of the second one-way gate 550B and the first one-way gate 550A are opposite from each other.

Referring to FIG. 5A, in this embodiment, the antenna switch group 520 comprises six two-way antenna switches. The first terminal of the antenna switch group 520 is coupled with the fourth node 565B, and the second terminal of the antenna switch group 520 is coupled with an antenna address bus 505C of the micro-controller 505, wherein each two-way switch control eight antennas. Furthermore, the two-way antenna group 525 comprises forty-eight antennas, and the two-way antenna group 525 is individually coupled with the two-way antenna switches of the antenna switch group 520.

Figure 5C:
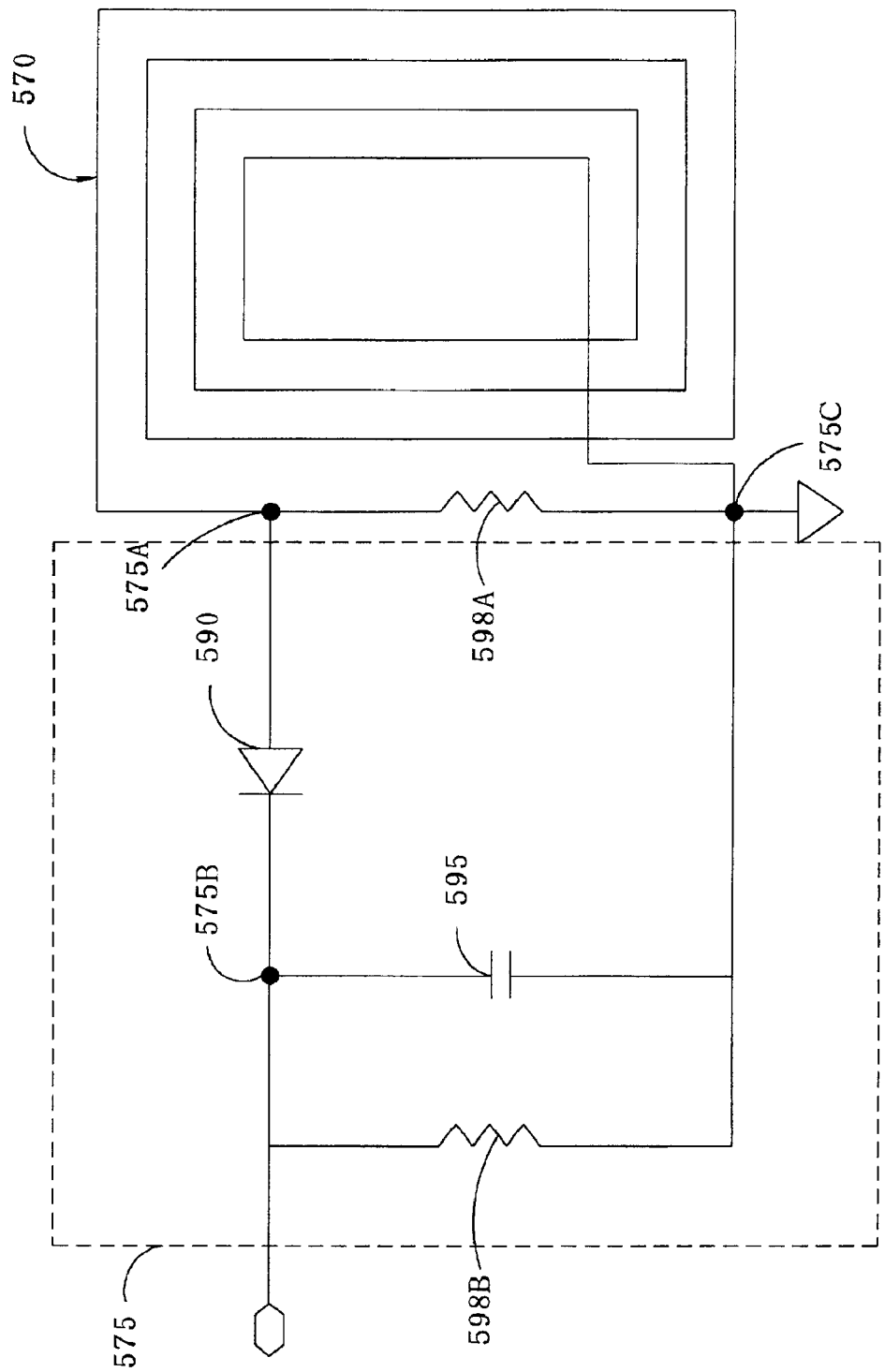
FIG. 5C shows block diagram of the induced-charge circuit of the peripheral apparatus with wireless electromagnetic-induction in accordance with the fourth embodiment of the present invention.

As illustrated in FIG. 5B and FIG. 5C, in this embodiment, the induced-charge circuit 500B of the peripheral apparatus with wireless electromagnetic-induction comprises: an inductance coil 570, a rectifier 575, a sub-circuit 580 for controlling charge and a charge device 585, such as a rechargeable battery, wherein the inductance coil 570 is coupled with the rectifier 575, and the rectifier 575 is coupled with the sub-circuit 580 for controlling charge, and the sub-circuit 580 for controlling charge is coupled with the charge device 585. Furthermore, the rectifier 575 comprises: a diode device 590 whose one terminal is coupled with the first terminal of the inductance coil 570 to form the fifth node 575A; a capacitor 595 whose one terminal is coupled with the other terminal of the diode device 590 to form the sixth node 575B, wherein the sixth node 575B is coupled with the sub-circuit 580 for controlling charge; a first resister 598A whose one terminal is coupled with the fifth node 575A and the other terminal is coupled with the second terminal of the inductance coil 570 to form a seventh node 575C, wherein the seventh node 575C is coupled with the other terminal of the capacitor 595; the second resister 598B whose one terminal is coupled with the sixth node 575B and the other terminal is coupled with the seventh node 575C.

As illustrated in FIG. 5A and FIG. 5C, in this embodiment, when the peripheral apparatus with wireless electromagnetic-induction is located within the environment around the apparatus with cordless pressure-sensitivity and electromagnetic-induction, a value of 8 bits that has set in the micro-controller 505 is transmitted into the specific frequency generator 510 via the frequency control bus 505A to control the first programmable frequency divider 530A and the second programmable frequency divider 530B. A clock signal is transmitted into the NAND gate 540 via the clock enable terminal 540B and the clock input terminal 540C whereby a frequency is transmitted into the first programmable frequency divider 530A from the NAND gate 540. Afterward, the first dividing process is performed by the first programmable frequency divider 530A and the second programmable frequency divider 530B, so as to form the first specific frequency. Subsequently, the first specific frequency is transmitted into the D-type flip-flop device 545. The second dividing process is performed by the D-type flip-flop device 545 to form the second specific frequency, wherein the second dividing process in the D-type flip-flop device 545 is controlled by the specific frequency enable terminal 545A.

Then the second specific frequency is transmitted into the second one-way gate 550B of the two-way gate control device 515 via the specific frequency output terminal 545B of the D-type flip-flop device 545, wherein the micro-controller 505 control the first one-way gate 550A and the second one-way gate 550B by way of using the I/O control terminal 505B. When switching on the first one-way gate 550A, the second one-way gate 550B is switched off so the transmitted direction of the first one-way gate 550A is the receiving direction. On the contrary, when switching off the first one-way gate 550A, the second one-way gate 550B is switched on, so that the second specific frequency is transmitted into the antenna switch group 520 via the second node 565B, that is, the transmitted direction of the second one-way gate 550B is the emitting direction. At the same time, the micro-controller 505 can switch on each two-way antenna switch of the antenna switch group 520 in sequence in accord with the time-sharing, whereby the two-way antenna group 525 can emit the electromagnetic wave with the second specific frequency. When the apparatus with cordless pressure-sensitivity and electromagnetic-induction emits the electromagnetic wave with the second specific frequency into the surroundings, the inductance coil 570 of the peripheral apparatus with wireless electromagnetic-induction receives variations of the electromagnetic field that result from the electromagnetic wave with the second specific frequency, whereby the induced-current is produced within the inductance coil 570 by the electromagnetic induction. Afterward, the induced-current is transmitted into the rectifier 575, and then the sub-circuit 580 that controls the charge transmits of the current to the charge device 585, so as to charge the peripheral apparatus with wireless electromagnetic-induction.

Furthermore, when the two-way antenna group 525 is set the status for receiving, the micro-controller 505 controls to switch on the first one-way gate 550A and switch off the second one-way gate 550B via the I/O control terminal 505B. At the same time, the micro-controller 505 controls to switch on each two-way antenna switch of the antenna switch group 520 in turn via antenna address bus 505C, whereby the two-way antenna group 525 can receive the electromagnetic wave with specific frequency. When at least one antenna of the two-way antenna group 525 is open, there is a signal with a large amplitude of vibration on the antenna. Therefore, the position where the peripheral apparatus with wireless electromagnetic-induction is located on the two-way antenna group 525 can be discovered by detecting the signal with a large amplitude of vibration on the antenna.

In these embodiments of the present invention, the present invention can apply a two-way gate control sub-circuit, so as to make the system with cordless pressure-sensitivity and electromagnetic-induction to receive the electromagnetic wave from the peripheral apparatus. On the other hand, this invention can also apply a sub-circuit for generating a specific frequency, so as to make the system with cordless pressure-sensitivity and electromagnetic-induction to emit the specific electromagnetic wave to the peripheral apparatus. Furthermore, in this invention, the two-way antenna is served as the emitted terminal of the electromagnetic wave with the specific frequency that is produced by the system with cordless pressure-sensitivity and electromagnetic-induction, and the electromagnetic wave with the specific frequency is emitted via the two-way antenna, so as to make the variation of the electromagnetic field, and that induce current and voltage in the peripheral apparatus that has a charge circuit with inductance coil, whereby the present invention can achieve the effect of wireless charge. Therefore, this invention corresponds to economic effect and utilization in industry.

Of course, it is possible to apply the present invention for the system with cordless pressure-sensitivity and electromagnetic-induction, and to any charge apparatus with electromagnetic induction. Also, the two-way gate control circuit and the specific frequency circuit of the present invention are applied to produce the specific frequency concerning the system with cordless pressure-sensitivity and electromagnetic-induction has not been developed at present.

Obviously, many modifications and variations of the present invention are possible in light of the above teachings. It is therefore to be understood that within the scope of the appended claims, the present invention may be practiced otherwise than as specifically described herein.

Preferred embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

What is claimed is:

1. A system with cordless pressure-sensitivity and electromagnetic-induction, said system comprising:

a first sub-circuit for generating a control signal, wherein said first sub-circuit having a frequency control bus, an I/O control terminal, and an antenna address bus;

a second sub-circuit coupled to receive said control signal for generating a specific frequency, and coupled to said frequency control bus;

a third sub-circuit coupled to receive said control signal and receive said specific frequency in accord with control signal, and coupled to said I/O control terminal, wherein said third sub-circuit comprises a two-gate control sub-circuit comprises a plurality or one-way gates whose transmitting directions are different from each other;

a fourth sub-circuit coupled to receive control signal and receive said specific frequency from said third sub-circuit in accord with said control signal, and coupled to said antenna address bus, wherein said fourth sub-circuit comprises a sub-circuit for switching antenna; and an antenna loop, said fourth sub-circuit coupled to control said antenna loop, so as to emit the electromagnetic wave with said specific frequency via said antenna loop.

2. The system with cordless pressure-sensitivity and electromagnetic-induction according to claim 1, wherein said first sub-circuit can transmit a value of 8 bits into said second sub-circuit via said frequency control bus.

3. The system with cordless pressure-sensitivity and electromagnetic-induction according to claim 1, wherein said second sub-circuit comprises a sub-circuit for generating specific frequency that can perform a dividing process.

4. The system with cordless pressure-sensitivity and electromagnetic-induction according to claim 3, wherein said sub-circuit for generating specific frequency comprises a plurality of programmable frequency dividers.

5. The system with cordless pressure-sensitivity and electromagnetic-induction according to claim 3, wherein said sub-circuit for generating specific frequency comprises a flip-flop device.

6. The system with cordless pressure-sensitivity and electromagnetic-induction according to claim 1, wherein said third sub-circuit comprises a two-way gate control sub-circuit.

7. The system with cordless pressure-sensitivity and electromagnetic-induction according to claim 1, wherein said sub-circuit for switching antenna is coupled with said antenna loop.

8. The system with cordless pressure-sensitivity and electromagnetic-induction according to claim 1, wherein said sub-circuit for switching antenna comprises a plurality of antenna switches.

9. The system with cordless pressure-sensitivity and electromagnetic-induction according to claim 1, wherein said antenna loop comprises a plurality of two-way antennas.

10. A circuit for generating specific frequency of a system with cordless pressure-sensitivity and electromagnetic-induction, said circuit comprising:

an NAND gate whose input terminal coupled to receive a clock signal with a first frequency;

a sub-circuit for dividing frequency coupled to receive a control signal, and said sub-circuit for dividing frequency is coupled with the output terminal of said NAND gate to receive said clock signal with said first frequency, wherein said sub-circuit for dividing frequency perform a first process for dividing frequency to generate a clock signal with a second frequency according to said control signal; and a flip-flop device that is coupled with said sub-circuit for dividing frequency to receive said clock signal with said second frequency, so as to perform a second process for dividing frequency and generate a clock signal with a third frequency.

11. The circuit for generating specific frequency according to claim 10, wherein said NAND gate comprises a clock input terminal for receiving said clock signal with said first frequency.

12. The circuit for generating specific frequency according to claim 10, wherein said NAND gate comprises a clock enable terminal to control input of said clock signal with said first frequency.

13. The circuit for generating specific frequency according to claim 10, wherein said control signal comprises a value of 8 bits, and said first process for dividing frequency can be performed according to said value of 8 bits, so as to generate said clock signal with said second frequency.

14. The circuit for generating specific frequency according to claim 10, wherein said sub-circuit for dividing frequency comprises a plurality of programmable frequency dividers that are coupled with a frequency control bus to receive said control signal.

15. The circuit for generating specific frequency according to claim 10, wherein said clock signal with said second frequency comprises a frequency arrangement about between said first frequency/256 and said first frequency/1.

16. The circuit for generating specific frequency according to claim 10, wherein said flip-flop device comprises a D-type flip-flop device.

17. The circuit for generating specific frequency according to claim 10, wherein said flip-flop device comprises a specific frequency enable terminal coupled to control said second process for dividing frequency.

18. The circuit for generating specific frequency according to claim 10, wherein said flip-flop device comprises a specific frequency output terminal coupled to transmit said clock signal with said third frequency.

19. The circuit for generating specific frequency according to claim 10, wherein said clock signal with said third frequency comprises a frequency arrangement about between said first frequency/512 and said first frequency/2.

20. A circuit with two-way transmission and electromagnetic induction of a system with cordless pressure-sensitivity and electromagnetic-induction, said circuit comprising:
   a first programmable frequency divider that is connected with a NAND gate;
   a second programmable frequency divider that is connected with said first programmable frequency divider to form a first node and a second node, wherein said first node is connected with a micro-controller of said system with cordless pressure-sensitivity and electromagnetic-induction by way of using a frequency control bus;
   a D-type flip-flop device that is connected with said second node;
   a first one-way gate that is connected with an amplifier of said system with cordless pressure-sensitivity and electromagnetic-induction;
   an NOT gate whose the input terminal is connected with said first one-way gate to form a third node, wherein said third node is connected with a I/O control terminal of said micro-controller;
   a second one-way gate that is connected with the output terminal of said NOT gate and said D-type flip-flop device, wherein said second one-way gate and said first one-way gate are connected from each other to form a fourth node;
   a plurality of two-way antenna switches that are connected with said fourth node, wherein said plurality of two-way antenna switches are connected with said micro-controller by way of using an antenna address bus; and
   a plurality o two-way antennas that are connected with said plurality of two-way antenna switches.

21. The circuit with two-way transmission and electromagnetic induction according to claim 20, wherein said NAND gate comprises a clock enable terminal.

22. The circuit with two-way transmission and electromagnetic induction according to claim 20, wherein said NAND gate comprises a clock input terminal.

23. The circuit with two-way transmission and electromagnetic induction according to claim 20, wherein said D-type flip-flop device comprises a specific frequency enable terminal.

24. The circuit with two-way transmission and electromagnetic induction according to claim 20, wherein said D-type flip-flop device comprises a specific frequency output terminal that is connected with said second one-way gate.

25. The circuit with two-way transmission and electromagnetic induction according to claim 20, wherein the transmitting direction of said first one-way gate is a receiving direction.

26. The circuit with two-way transmission and electromagnetic induction according to claim 20, wherein the transmitting direction of said second one-way gate is an emitting direction.

27. The circuit with two-way transmission and electromagnetic induction according to claim 20, wherein every one of said plurality of two-way antenna switches can control at least eight antennas.

28. A induced-charge circuit of a system with cordless pressure-sensitivity and electromagnetic-induction, said induced-charge circuit comprising:
   an inductance coil for receiving the electromagnetic wave with a specific frequency, wherein said inductance coil can generate an induced-current according to the electromagnetic induction;
   a first sub-circuit that is coupled with said inductance coil to receive said induced-current and including a rectifier to perform a rectification, said rectifier including:
      a diode device whose one terminal is coupled with a first terminal of said inductance coil to form a first node;
      a capacitor whose one terminal is coupled with the other terminal of said diode device to form a second node, wherein said second node is coupled with said second sub-circuit;
      a first resister whose one terminal is coupled with said first node and the other terminal of said first resister is coupled with the second terminal of said inductance coil to form a third node, wherein said third node is coupled with the other terminal of said capacitor; and
      a second resister whose one terminal is coupled with said second node and the other terminal of said second resister is coupled with said third node;
   a second sub-circuit that is coupled with said first sub-circuit to control charge process; and
   a charge device that is coupled with said second sub-circuit to perform charge process.

29. A induced-charge circuit of a system with cordless pressure-sensitivity and electromagnetic-induction, said induced-charge circuit comprising:
   an inductance coil;
   a diode device whose one terminal is connected with a first terminal of said inductance coil to form a first node;
   a capacitor whose one terminal is connected with the other terminal of said diode device to form a second node;
   a first resister whose one terminal is connected with said first node and the other terminal of said first resister is connected with the second terminal of said inductance coil to form a third node, wherein said third node is connected with the other terminal of said capacitor;

a second resister whose one terminal is connected with said second node and the other terminal of said second resister is connected with said third node;

a sub-circuit for controlling charge process that is connected with said second node; and a rechargeable battery that is connected with said sub-circuit for controlling charge process.

30. An induced-charge circuit of a system with cordless pressure-sensitivity and electromagnetic-induction, said induced-charge circuit comprising:

an inductance coil for receiving the electromagnetic wave with a specific frequency, wherein said inductance coil can generate an induced-current according to the electromagnetic induction;

a first sub-circuit that is coupled with said inductance coil to receive said induced-current, so as to perform a rectification;

a rectifier for controlling charge, wherein said rectifier is coupled with said first sub-circuit, and said rectifier comprises a diode device whose one terminal is coupled with a first terminal of said inductance coil to form a first node; a capacitor whose one terminal is coupled with the other terminal of said diode device to form a second node; a first resister whose one terminal is coupled with said first node and the other terminal of said first resister is coupled with the second terminal of said inductance coil to form a third node, wherein said third node is coupled with the other terminal of said capacitor; and a second resister whose one terminal is coupled with said second node and the other terminal of said second resister is coupled with said third node; and a second sub-circuit that is coupled with said first sub-circuit to control charge process, and is coupled with said second node; and a charge device that is coupled with said second sub-circuit to perform charge process.

31. The induced-charge circuit according to claim 30, wherein said charge device comprises a rechargeable battery.

* * * * *